US011201752B2

United States Patent
Curtis et al.

(10) Patent No.: US 11,201,752 B2
(45) Date of Patent: Dec. 14, 2021

(54) REMOVAL OF COMMON MODE CHOKE

(71) Applicant: Cisco Technology, Inc., San Jose, CA (US)

(72) Inventors: George Edward Curtis, San Jose, CA (US); William Oberlin, San Jose, CA (US); Chris Desiniotis, Fremont, CA (US); Amrik Singh Bains, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1127 days.

(21) Appl. No.: 15/384,192

(22) Filed: Dec. 19, 2016

(65) Prior Publication Data

US 2018/0175675 A1    Jun. 21, 2018

(51) Int. Cl.
*H04L 12/10* (2006.01)
*H02J 50/10* (2016.01)
*H02J 50/80* (2016.01)

(52) U.S. Cl.
CPC ............. *H04L 12/10* (2013.01); *H02J 50/10* (2016.02); *H02J 50/80* (2016.02)

(58) Field of Classification Search
CPC .......... H02J 50/80; H02J 50/10; H03H 11/50; H04L 25/0266; H04L 25/0272; H02L 12/00

USPC .......................................................... 307/104
See application file for complete search history.

(56) References Cited

U.S. PATENT DOCUMENTS

| | | | | |
|---|---|---|---|---|
| 2007/0208961 | A1* | 9/2007 | Ghoshal | G06F 1/189 713/300 |
| 2008/0122503 | A1* | 5/2008 | Okuda | H03L 7/07 327/149 |
| 2008/0235523 | A1* | 9/2008 | Hussain | G06F 1/266 713/300 |
| 2010/0283532 | A1* | 11/2010 | Horan | G09G 5/003 327/530 |
| 2010/0283894 | A1* | 11/2010 | Horan | H04N 5/775 348/441 |
| 2013/0288526 | A1* | 10/2013 | Rascon | H01R 13/6581 439/607.35 |
| 2013/0301745 | A1* | 11/2013 | Maniktala | H04L 12/10 375/258 |
| 2014/0017542 | A1* | 1/2014 | Suzuki | H01M 2/202 429/99 |
| 2020/0266854 | A1* | 8/2020 | Gardner | H04B 3/548 |

* cited by examiner

*Primary Examiner* — Hal Kaplan
*Assistant Examiner* — Swarna N Chowdhuri
(74) *Attorney, Agent, or Firm* — Polsinelli PC

(57) ABSTRACT

Disclosed herein is a technique for a connection from an Ethernet physical transceiver (PHY) to an integrated connector module (ICM) where the connection and the ICM lack a common mode choke. The ICM can include a magnetic coupler that directly couples an Ethernet jack and the PHY.

17 Claims, 3 Drawing Sheets

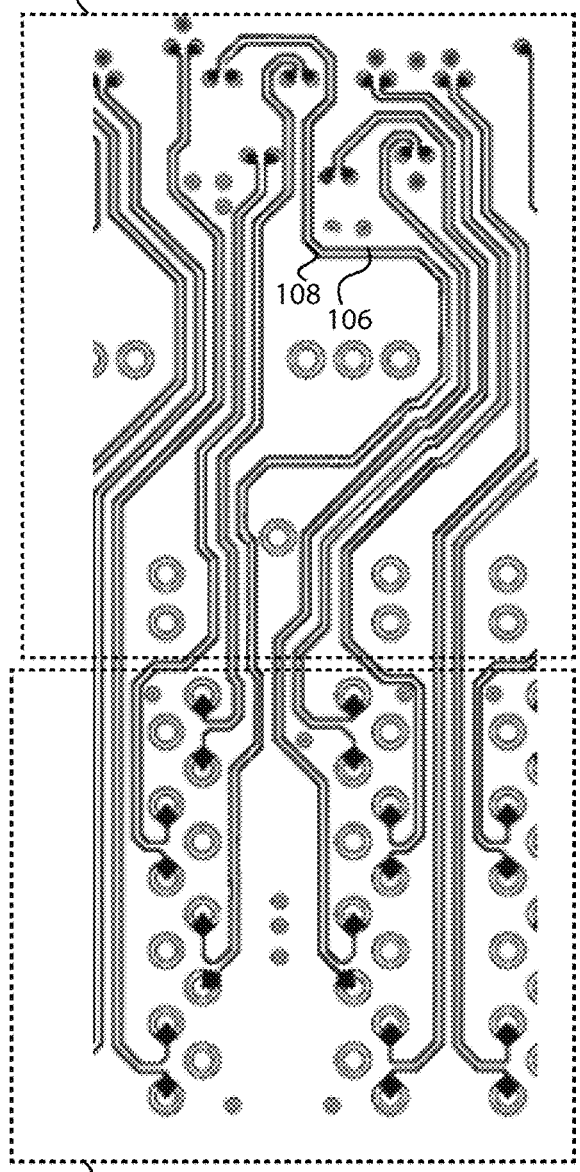
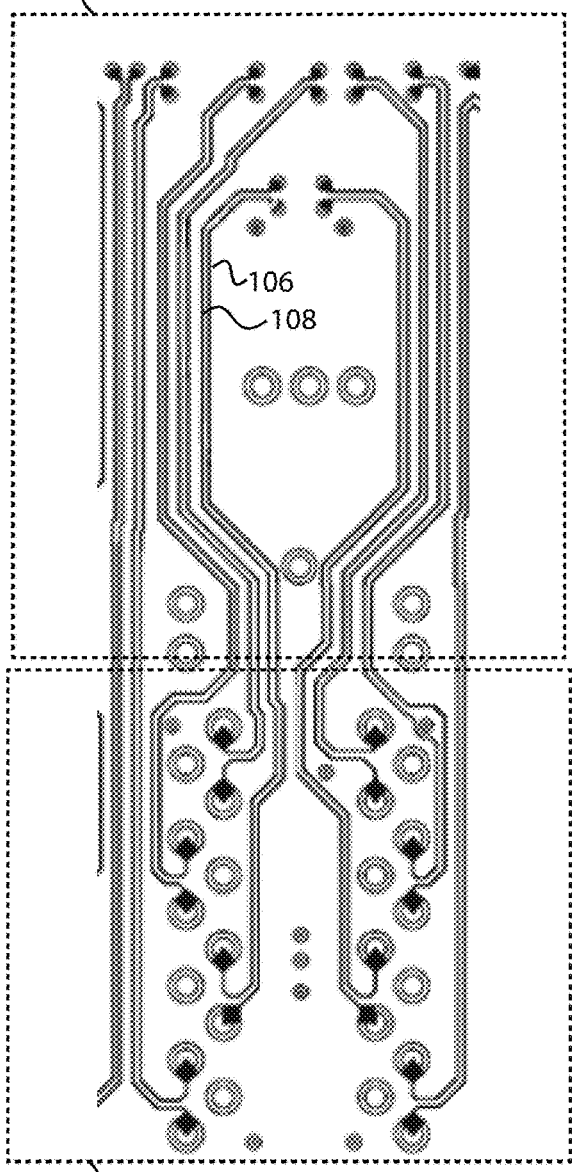

REMOVAL OF COMMON MODE CHOKE

TECHNICAL FIELD

The present technology pertains to network devices and specifically to twisted pair networking devices.

BACKGROUND

Twisted pair data cables like those in Ethernet, utilize pairs of positive signal wires and complementary negative signal wires. When the positive signal wire is high, the corresponding negative signal wire should be low and when the positive signal wire is low, the negative signal wire should be high. Traditionally, an integrated connector module (ICM) is built into a jack. The ICM traditionally removes common mode noise using a common mode choke (CMC) and magnetically isolates the signal wires using a transformer.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 5A and 5B show routing of positive signal wire and negative signal wire through power over Ethernet connection area and ICM connection area.

DESCRIPTION OF EXAMPLE EMBODIMENTS

Overview

Disclosed herein is a technique for a connection from an Ethernet physical transceiver (PHY) to an integrated connector module (ICM) where the connection and the ICM lack a common mode choke. The PHY to ICM connection includes four pairs of signal traces. Routing these traces on a printed circuit board PCB so that they are relatively the same length can prevent skew between a pair of signal traces. Removing the common mode choke can allow better organization of the PCB.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a more cost-efficient Ethernet apparatus.

A common mode choke is a transformer that can remove common mode noise and skew. Skew occurs when the traces for the signal wires are of unequal length. Designing an integrated connector module to include a common mode choke can be costly as the size and fabrication constraints typically require manual winding of the common mode choke. Some designs have placed the common mode choke outside of the integrated connector module. However, this approach can extend the jack's dimensions, interfere with PCB organization, and still carry an undesirable cost.

Figure 1B:
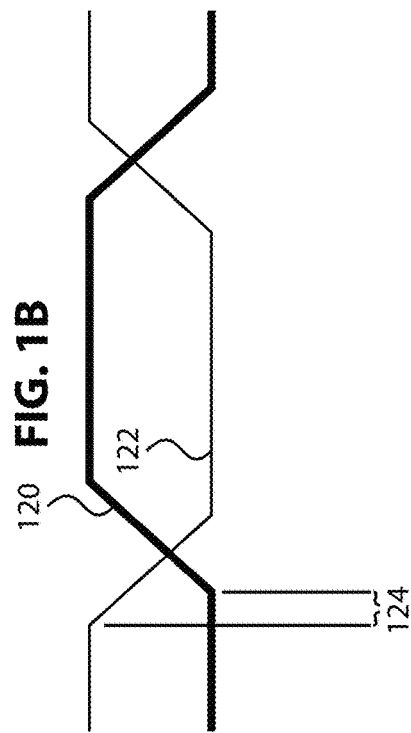
FIGS. 1B and 1E show corresponding example signal representations.
Figure 1E:
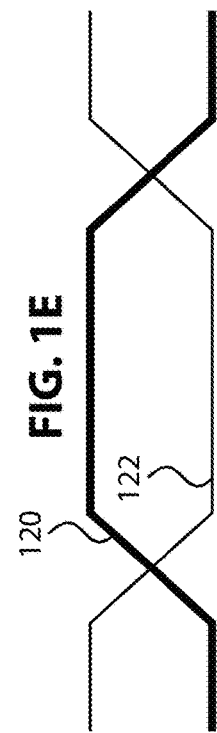
Figure 1A:
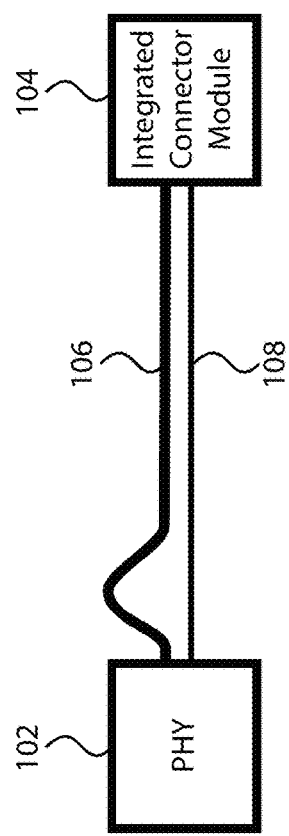
FIGS. 1A, 1C, and 1D show an Ethernet physical transceiver connected to an integrated connector module
Figure 1C:
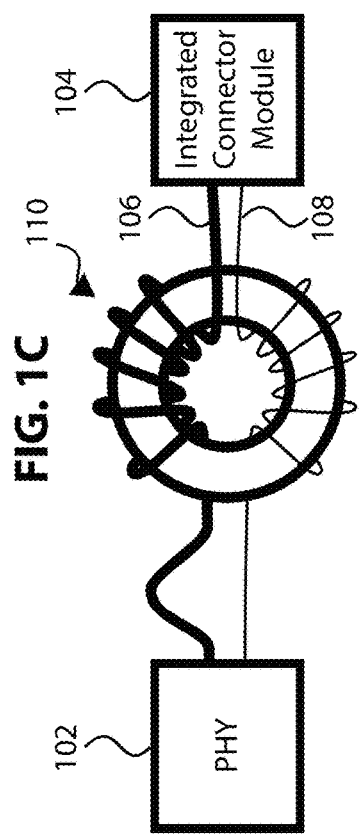
Figure 1D:
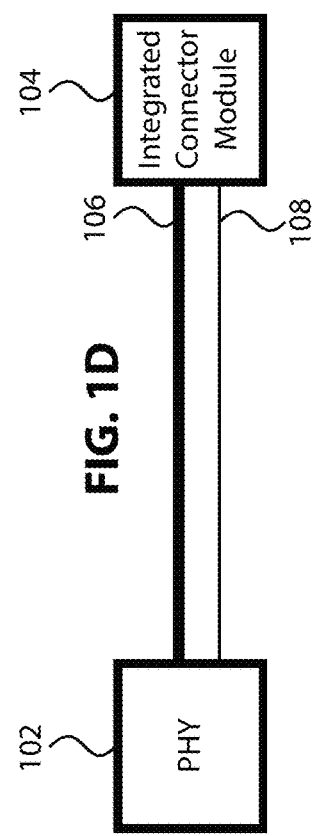

FIGS. 1A, 1C, and 1D show an Ethernet physical transceiver (PHY) connected to an integrated connector module (ICM) while FIGS. 1B and 1E show corresponding example signal representations. PHY 102 can convert digital instructions into physical signals (e.g., data symbols). Integrated connector module (ICM) 104 can contain a magnetic coupler (e.g., a transformer) to isolate the internal wiring with the external cable run. ICM 104 can include center tabs on transformers for Power over Ethernet (PoE) extraction. In some embodiments, ICM 104 does not have a common mode choke.

Positive signal wire 106 and negative signal wire 108 can connect PHY 102 and ICM 104. Negative signal wire 108 can be the inverse of positive signal wire 106; for example, if positive signal wire 106 is set high, negative signal trace can be set low (relative to a common offset, if present). Positive signal wire 106 and negative signal wire 108 can be a differential pair carrying differential signals. Common mode noise can be any discrepancy between the average of the two differential signals and a reference voltage. Common mode noise can include skew (e.g., a temporal offset between the two signals). Common mode noise can be introduced by the driver (e.g., PHY 102) driving the two differentials signals in exact synchronization. For example, on signal might be raised high a moment before the other signal is lowered. Another source of common mode noise is inconsistent wire lengths. For example, positive signal wire 106 in FIG. 1A has a bend that increases its length in comparison to negative signal wire 108. Inconsistent wire lengths can result in skew which is a form of common mode noise. FIG. 1B shows a representation of differential signals with skew. For example, positive signal 120 can be offset from negative signal 122 by offset 124. This can be caused by the inconsistent wire (or trace) length.

To overcome signal skew, previous approaches included a common mode choke (CMC) 110 as shown in FIG. 1C. CMC 110 can be a ferrite loop with both positive signal wire 106 and negative signal wire 108 wrapped around it. CMC 110 can thus harmonize the two signals as shown in FIG. 1E. CMC 110 can be costly, can add bulk to the PCB, and cause traces to be disorganized.

Alternative to CMC 110, positive signal wire 106 and negative signal wire 108 can be directly connected to ICM 104 as shown in FIG. 1D. For example, the wires can be PCB traces between the two components. In order to minimize skew, positive signal wire (or trace) 106 and negative signal wire (or trace) 108 can be close to the same length. For example, avoiding curves in the traces can help the traces be of similar length. The difference in trace length between a pair of differential signal wires (or traces) can be termed a pair length tolerance. For example, if positive wire 106 is 0.5 inches long and negative wire 108 is 0.8 inches long then the pair length tolerance can be 0.3 inches. Pair length tolerances less than 0.05 inches can minimize skew (e.g., 0.04 inches, 0.01 inches, etc.). Having uninterrupted signal traces (e.g., positive signal wire 106 and negative signal wire 108) by omitting a common mode choke can facilitate shorter total trace lengths. For example, a signal trace can be less than 4.25 inches (e.g., 4 inches, 3 inches, etc.). This can save PCB space and minimize the amount of signals picked up by the trace. In some embodiments, having all traces (even ones of different pairs) be of similar length can help minimize crosstalk between traces.

In some embodiments, the pair length tolerance on each layer can be small. For example, if a pair of traces traverse a first layer and then pass through a via to a second layer, their pair length tolerance on the first layer can be small and the pair length tolerance on the second layer can be small; this being alternative to large layer-based pair length tolerances that cancel each other out.

In some embodiments, the traces can pass from PHY 102 to ICM 104 on a single layer, without needing vias to change PCB layers in transit. For example, if a PCB has two layers, a top layer and a bottom layer, and PHY 102 and ICM 104 are on the top layer, then PHY 102 can connect to a trace on the bottom layer that continues uninterrupted until it reaches ICM 104. Because vias (e.g., having a trace move from one layer to another) can introduce noise, limiting them can help ensure a cleaner signal with minimal skew between signal pairs. In some embodiments, the PCB layer that the traces are on is not the surface layer (where ICM 104 is attached).

Figure 2A:
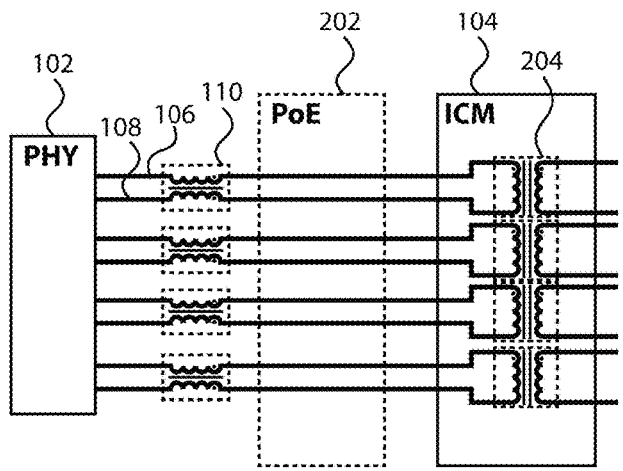
FIGS. 2A and 2B show example schematics according to various embodiments.
Figure 2B:
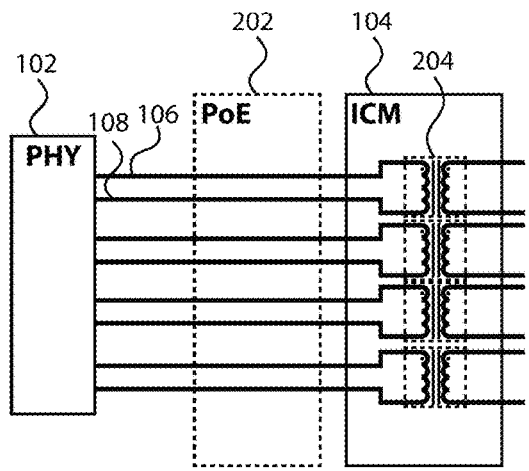

FIGS. 2A and 2B show example schematics for Ethernet physical transceiver (PHY), common mode choke (CMC), power over Ethernet region (PoE) and integrated connection module (ICM). FIG. 2A shows an example schematic which includes CMC 110 while the schematic in FIG. 2B omits CMC 110. A pair of traces (positive signal wire 106 and negative signal wire 108) can go through CMC 110, pass through PoE connection area 202, and end at connection points for ICM 104. Alternatively, a pair of traces can be routed from PHY 102, through PoE connection area 202, and end at connection points for ICM 104. ICM 104 can include magnetics 204 for isolating an external voltage from the internal signal wires. ICM 104 can be a housing with an Ethernet jack (e.g., Ethernet receptacle) on one side and PCB connections on another side.

Figure 3A:
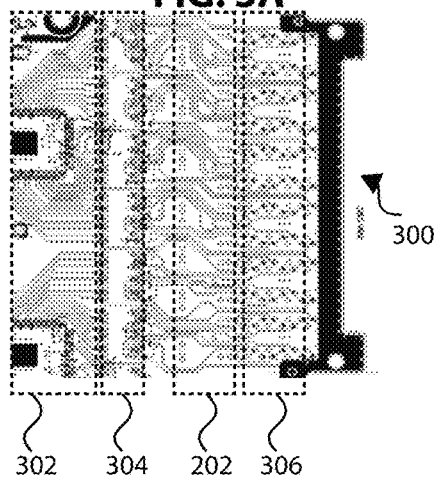
FIGS. 3A and 3B show example schematics according to various embodiments.
Figure 3B:
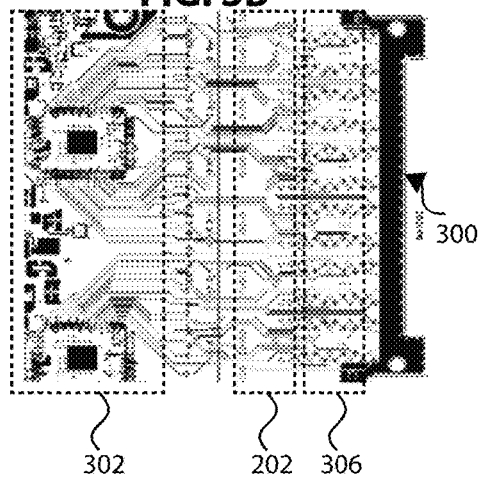

FIGS. 3A and 3B show example schematics according to various embodiments. Networking card 300 can have a PHY area 302, CMC area 304, PoE connection area 202, and ICM connection area 306. In networking card 300 of FIG. 3B, CMC area 304 is omitted and there is no common mode choke 110.

Figure 4A:
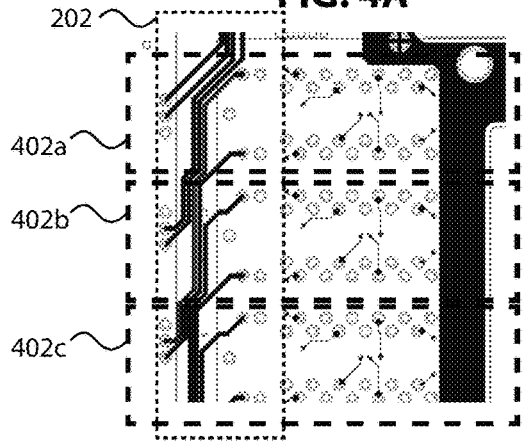
FIGS. 4A and 4B show greater detail of a power over Ethernet connection area.
Figure 4B:
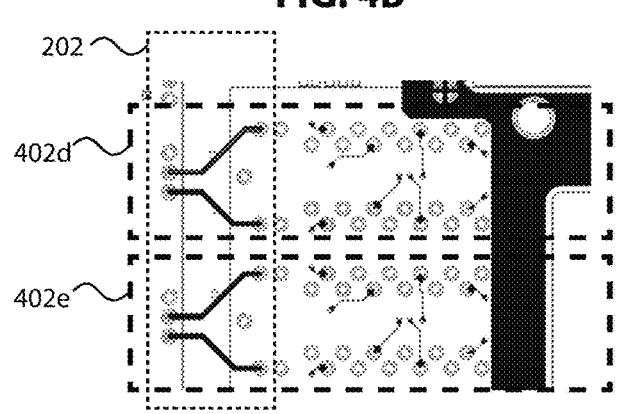

FIGS. 4A and 4B show greater detail of PoE connection area 202. In FIG. 4A, PoE connection area 202 has circuitous routing while PoE connection area 202 in FIG. 4B has more direct routing. More direct can mean a minimal number of bends (e.g., 2, 3, 4, or fewer) and a minimal distance. Because the routing of PoE connection area 202 is more direct, the signal wires can also be more direct.

In previous approaches, a PoE module that was soldered to networking card 300 was designed so that certain connections were grouped together such as the signal wires and the voltage and ground wires. This required the networking card 300 to route signal and voltage wires to their destinations. Using networking card 300 to route signal and voltage wires causes congestion in routing on the board and forced Ethernet signal wire traces to become disorganized. This is exemplified as shown in FIG. 4A where PoE traces from one port region 402 (e.g., port region 402$_b$) traverse into another port region (e.g., port region 402$_a$).

Disclosed herein is a new way for organizing the PoE module and PoE connections whereby PoE connections are generally grouped by port. FIG. 4B shows an improved technique by having the PoE connections generally grouped by port. For example, port region 402$_d$ has a pair of PoE connections in PoE connection area 202 that service connections in port region 402$_d$ while the adjacent port region 402$_e$ has PoE connections in PoE connection area 202 that service its respective connections. The PoE traces from port region 402$_d$ do not enter port region 402$_e$. Thus, each port region 402 contains its respective PoE connections and traces without having the traces traverse into an adjacent port region 402. A port region can include connections for a single Ethernet connection (or port), two Ethernet connections, or three Ethernet connections.

FIGS. 5A and 5B show routing of positive signal wire 106 and negative signal wire 108 through PoE connection area 202 and ICM connection area 306. FIGS. 5A and 5B can show a different layer than shown in FIGS. 4A and 4B. Because of the omission of CMC 110 in the PCB of FIG. 5B, PoE connections are cleaner and the router of the signal wires through PoE connection area 202 is cleaner. This can result in a better signal without skew.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. An integrated connector module (ICM) housing comprising:
   an Ethernet jack;
   a transformer disposed within the ICM housing, the transformer electrically coupled to the Ethernet jack and configured to provide a magnetic coupling between the Ethernet jack and a printed circuit board (PCB) connection disposed outside the ICM housing via at least one differential signal wire pair, the at least one differential signal wire pair including a first wire having a first length and a second wire having a second length, the first length and the second length defining a pair length tolerance less than a predetermined tolerance, the at least one differential signal wire pair extending through a region located between the Ethernet jack and the ICM housing along a route with a number of bends less than a predetermined number of bends.

2. The ICM housing of claim 1, wherein the transformer is configured to receive an electrical signal via the Ethernet jack, and relay the electrical signal to the PCB connection via the magnetic coupling.

3. The ICM housing of claim 1,
wherein,
the first wire spans from the ICM to an Ethernet transceiver (PHY), and
the second wire spans from the ICM to the PHY.

4. The ICM housing of claim 1, wherein the pair length tolerance is less than 0.01 inches.

5. The ICM housing of claim 2, wherein the transformer couples at least a pair of signal wires from the Ethernet jack.

6. The ICM housing of claim 2,
wherein,
the at least one differential signal wire pair includes at least four differential signal wire pairs,
the transformer couples the at least four differential signal wire pairs, and
the predetermined tolerance of the at least four differential signal wire pairs is less than one inch between an Ethernet transceiver (PHY) and the PCB connection.

7. The ICM of claim 6, wherein each signal wire of the four differential signal wire pairs has a trace length less than four inches between the PHY and the PCB connection.

8. The ICM of claim 1, wherein the at least one differential signal wire pair spans from its respective connection at the ICM to a point of electrical connection with an Ethernet transceiver (PHY) along a single PCB printed circuit board (PCB) layer.

9. A method comprising:
receiving, at a transformer disposed within an integrated connector module (ICM) housing and from an Ethernet jack, an Ethernet signal;
transforming, at the transformer, the Ethernet signal to a transformed signal; and
communicating the transformed signal to a printed circuit board (PCB) connection outside of the ICM housing via at least one differential signal wire pair, the at least one differential signal wire pair including a first wire having a first length and a second wire having a second length, the first length and the second length defining a pair length tolerance less than a predetermined tolerance, the at least one differential signal wire pair extending through a region located between the Ethernet jack and the ICM housing along a route with a number of bends less than a predetermined number of bends.

10. The method of claim 9, wherein the Ethernet signal is communicated using at least a first pair of signal wires.

11. The method of claim 10 further comprising:
communicating the transformed signal along a single PCB layer from the connection outside of the ICM housing to an Ethernet transceiver (PHY).

12. The method of claim 9, further comprising:
communicating the transformed signal from the PCB connection to an Ethernet transceiver (PHY) using the at least one differential signal wire pair, the at least one differential signal wire pair including four differential signal wire pairs, the predetermined tolerance being less than 0.01 inches.

13. The method of claim 12, wherein each of the four differential signal wire pairs has a trace length that is less than four inches.

14. The ICM of claim 1, wherein the region is a power over Ethernet region.

15. A method comprising:
providing an integrated connector module (ICM) housing;
disposing a transformer within the ICM housing;
disposing a printed circuit board (PCB) connection outside the housing; and
electrically connecting the transformer and the PCB via at least one differential signal wire pair that meets a plurality of predefined signal wire routing criteria including a maximum pair length tolerance and a maximum number of bends.

16. The method of claim 15, wherein the maximum pair length tolerance is less than 0.05 inches.

17. The method of claim 15, wherein the maximum number of bends is four bends.

* * * * *